Patented Jan. 23, 1945

2,367,994

UNITED STATES PATENT OFFICE 2,367,994

LEAVENING PROCESS

Harold H. Browne, Arlington, Va.; dedicated to the free use of the People in the territory of the United States No Drawing. Application July 26, 1943,
Serial No. 496,145

10 Claims. (Cl. 99—95)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to edible baked goods, such as bread and so forth, and in particular to those goods which incorporate milk or a milk product containing lactose as one of the ingredients.

According to conventional bakery practice, *Saccharomyces cerevisiae*, commonly known as "baker's yeast," is used as the leavening agent, sucrose or malt syrup being added as a fermenting sugar to aid in the formation of carbon dioxide. Baker's yeast will not ferment lactose; consequently, when milk (the term "milk" being used to include any milk product containing lactose) is used as an ingredient, the lactose remains in the baked product.

This invention has among its objects the use of the lactose of milk as a fermenting sugar to contribute to the leavening, thus eliminating the necessity for the use of additional sugar, and resulting in a product substantially free of the lactose.

I have found that lactose-fermenting yeasts, such as *Torula cremoris* (#2512 A. T. C. C.), which is preferred because it gives the most rapid fermentation, *Torula lactosa* (#7014 A. T. C. C.), and yeast (#2702 A. T. C. C.), can be used in baking to ferment the lactose, and under proper control give excellent results.

In general, according to the present invention, such a yeast is added to the milk-containing dough. The lactose-fermenting yeast is used in conjunction with baker's yeast without the use of any added sugar other than the lactose, the baker's yeast being used to ferment sugars present in the dough which are not fermented by the lactose-fermenting yeast. For example, with milk powder equal to about 6 percent of the flour weight, equal quantities of baker's yeast and lactose-fermenting yeast may be used. By combining the two yeasts in this manner excellent results are obtained. These proportions may, of course, be varied, depending on the quantity of milk, on the type of flour used, whether the straight dough or sponge process is employed, and whether a bromate be present. In any case, however, the dough contains insufficient sugar other than the lactose contained in the milk to produce adequate leavening.

As an example of a bakery product according to this process, a straight dough was mixed consisting of 300 g. of wheat flour, 18 g. of milk powder, 180 g. of water, 3 g. of salt, 4.5 g. of baker's yeast, and 4.5 g. of *Torula cremoris* (#2512 A. T. C. C.). The dough was fermented and proofed for 3½ hours at about 86° F. in the regular manner, and then baked for 25 minutes at about 450° F.

Tests show that using equal parts of baker's yeast and *Torula cremoris*, in the manner of the example, results in a gas production of from 25 percent to 40 percent greater than when all baker's yeast is used without addition of other sugars. This shows the effect of the *Torula cremoris* in fermentation of the lactose.

This invention results in a considerable saving in saccharine material, such as malt syrup or sucrose, in the production of milk-containing leavened goods.

Having thus described the invention, what is claimed is:

1. In the process of baking, leavening baked goods containing milk with lactose-fermenting yeast and baker's yeast, said goods containing insufficient sugar other than lactose contained in the milk to produce adequate leavening.

2. In the process of baking, mixing milk, lactose-fermenting yeast, and baker's yeast into unbaked dough, and permitting fermentation for leavening purposes, said dough containing insufficient sugar other than the lactose contained in the milk to produce adequate leavening.

3. A bakery dough containing milk, lactose-fermenting yeast, and baker's yeast as the leavening agents, said dough containing insufficient sugar other than the lactose contained in the milk to produce adequate leavening.

4. A bakery dough comprising flour, milk, baker's yeast, and lactose-fermenting yeast, whereby fermentation of the lactose aids in leavening the dough said dough containing insufficient sugar other than the lactose contained in the milk to produce adequate leavening.

5. A bakery dough comprising flour, milk, baker's yeast, and lactose-fermenting yeast, the lactose in the milk being the only sugar added, whereby fermentation of the lactose aids in leavening the dough.

6. The process of claim 1, in which the lactose-fermenting yeast is *Torula cremoris*.

7. The process of claim 2, in which the lactose-fermenting yeast is *Torula cremoris*.

8. The product of claim 3, in which the lactose-fermenting yeast is *Torula cremoris*.

9. The product of claim 4, in which the lactose-fermenting yeast is *Torula cremoris*.

10. The product of claim 5, in which the lactose-fermenting yeast is *Torula cremoris*.

HAROLD H. BROWNE.